Daniel M. Schwartz
Walter P. Schmitter
INVENTORS

ATTORNEY.

Patented Jan. 27, 1942

2,271,036

UNITED STATES PATENT OFFICE 2,271,036

CONTROLLER FOR FLUID PRESSURE CLUTCHES

Walter P. Schmitter, Wauwatosa, and Daniel M. Schwartz, Shorewood, Wis., assignors to The Falk Corporation, Milwaukee, Wis., a corporation of Wisconsin Application November 27, 1939, Serial No. 306,226

4 Claims. (Cl. 192—87)

This invention relates to controllers for fluid pressure clutches and the like.

In the copending application of Walter P. Schmitter, Serial No. 301,930, filed October 30, 1939, a reversible power transmission is shown involving a pair of fluid pressure clutches selectively operable to drive the transmission in either forward or reverse direction. In the arrangement therein disclosed fluid pressure is admitted to the clutches through separate channels in the driven rotating part and through a rotating joint having dual passages affording separate communication between the channels and pressure source. Exhaust of fluid pressure from the clutches is also effected through these channels and the passages in the joint.

An object of the present invention is to provide a novel combination and arrangement of parts by which a two-passage rotating joint may be avoided.

Another object is to avoid the use of two separate fluid conducting channels in the driven rotating part. This we accomplish by arranging a fluid pressure distributing valve concentrically within the clutches.

Another object is to provide a novel fluid control valve for combination with the rotating part in a manner to permit ready adjustment and control of the valve during operation.

Other more specific objects and advantages will appear from the following description of a fluid controller constructed in accordance with the present invention.

Figure 1:
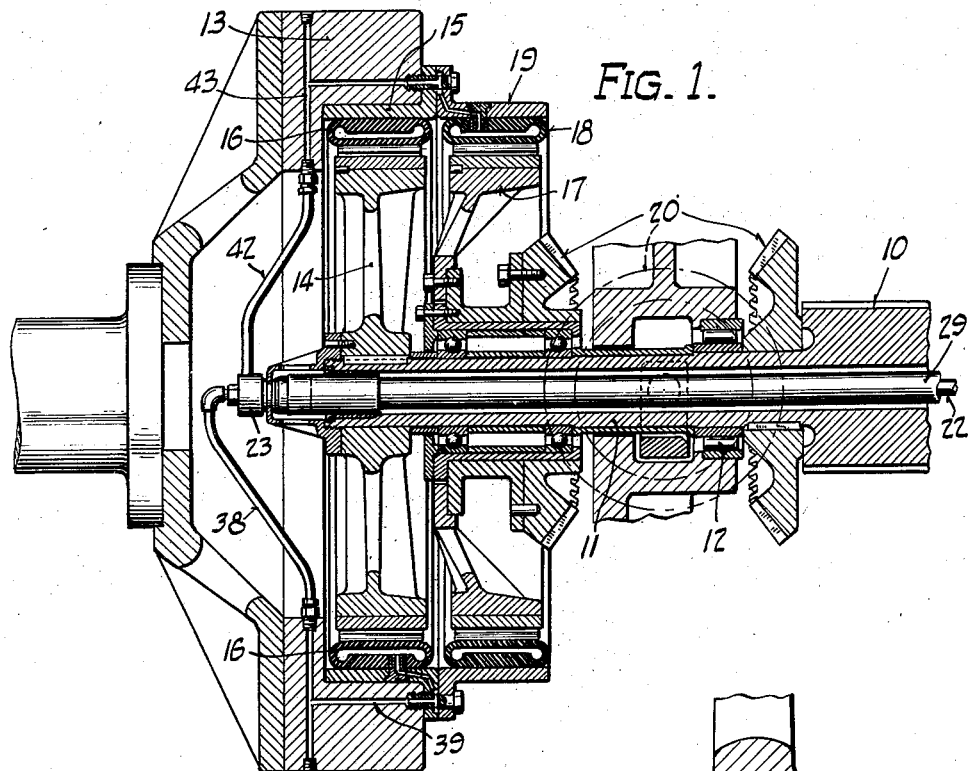
Figure 1 is a fragmentary sectional view of a clutch-controlled reversible power transmission equipped with a controller embodying the present invention.

For purposes of illustration and explanation, a controller constructed in accordance with the present invention is shown in Fig. 1 applied to a reversible power transmission substantially like that disclosed in the application hereinabove identified.

The transmission includes a speed reduction gear set of which the pinion 10 is an element, the pinion being carried by a hollow integral shaft 11 journalled in appropriate bearings, one of which is shown at 12, and projecting forwardly toward a rotary driver 13 disposed coaxially thereof. The inner member 14 of a fluid pressure clutch is keyed or otherwise fixed to the projected end of the pinion shaft 11, the outer member 15 of the clutch being carried by the driver 13 and being provided with an annular flexible gland 16 of rubber or the like adapted to be expanded into gripping contact with the inner clutch member 14 to thereby operatively connect the driver 13 to the shaft 11 to effect forward operation thereof.

The shaft 11 also supports the inner member 17 of a second similar clutch freely rotatable thereon and adapted to be engaged by a gland 18 mounted on the outer clutch member 19 carried by the driver 13. The inner member 17 of the second clutch is operatively connected to the shaft 11 through a train of bevel gears 20 by which the shaft is driven reversely.

In this instance both clutches are controlled by a valve disposed coaxially of the clutches and of the shaft 11 and free to rotate with the driver 13 and consequently with the clutch glands 16 and 18. The valve selected for illustration includes a substantially cylindrical body portion or core 21, attached at its rear end to a tube 22 which extends axially through the shaft 11, and provided at its forward end with a hollow head 23 attached thereto. The valve body 21 is retained against axial displacement by the forward end 24 of a cage 25 within which the valve is freely rotatable, the cage being mounted on the end of the shaft 11 and locked to the hub of the inner clutch member 14 for rotation therewith.

The valve shown also includes a surrounding sleeve member 26 which extends rearwardly from the valve body 21 and rotates therewith, and which is journalled within an appropriate bearing 27 within the shaft 11 so as to afford free relative rotation and axial movement between the member 26 and shaft. A bushing 28 between the member 26 and tube 22 serves to maintain a concentric or coaxial relation between the valve body 21 and surrounding sleeve, while permitting the latter to move axially of the valve body, the longitudinal position of the sleeve member 26 being controlled from the opposite end of the shaft 11 through appropriate means such as a tube 29 attached thereto and extending through the shaft.

The sleeve member 26 is provided with an annular chamber 30 surrounding the valve body 21 and equipped with appropriate leak-proof end seals 31 which are maintained in position by an intermediate spring 32, and effectively maintained in sealing contact with the valve body and with the chamber end walls by the fluid pressure in said chamber. Fluid pressure is maintained in the chamber 30, supplied thereto from an appropriate source through the tube 22 and through a channel 33 and radial ports 34 formed in the valve body. Other radial ports 35 communicate through a channel 36 and nipple 37 with a pipe 38 which, in turn, communicates through channels 39 with the gland 16 of one of the clutches. A third set of radial ports 40 communicate through channels 41 and the hollow head 23 with a pipe 42 which, in turn, communicates through channels 43 with the gland 18 of the other clutch.

Figure 2:
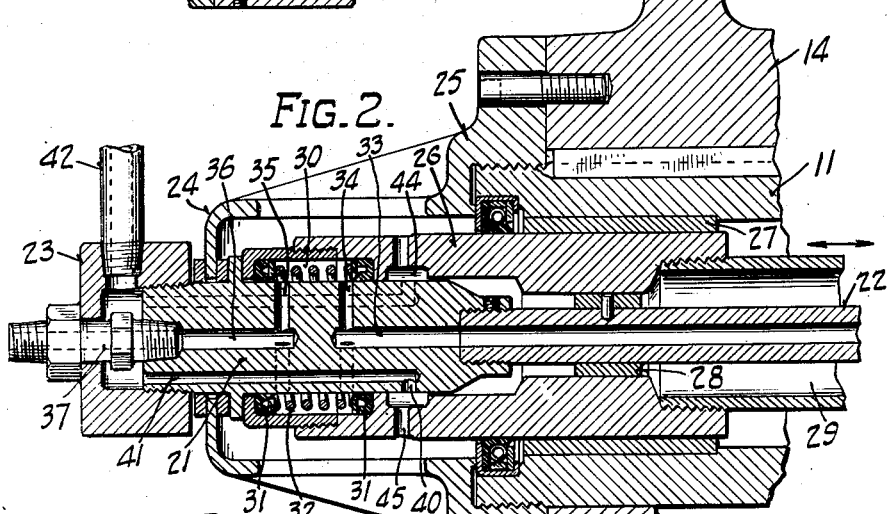
Fig. 2 is a sectional view of the controller on a larger scale.

In the valve shown, the ports 34 are disposed between the ports 35 and ports 40, so that when the sleeve member 26 is in the advanced position of Fig. 2, the ports 35 communicate with the port 34 through the chamber 30 and the ports 40 communicate with an annular channel 44 and exhaust ports 45 formed in the member 26. In this position of the member 26, fluid pressure is transmitted from the ports 34 to the clutch gland 16, while any pressure in the other clutch gland 18 is dissipated through the ports 40 and 45. When the member 26 is retracted into the position of Fig. 3, the chamber 30 communicates with ports 40 and fluid pressure is transmitted therethrough to the clutch gland 18, while ports 35 are uncovered and any pressure in the clutch gland 16 is dissipated therethrough.

Figure 3:
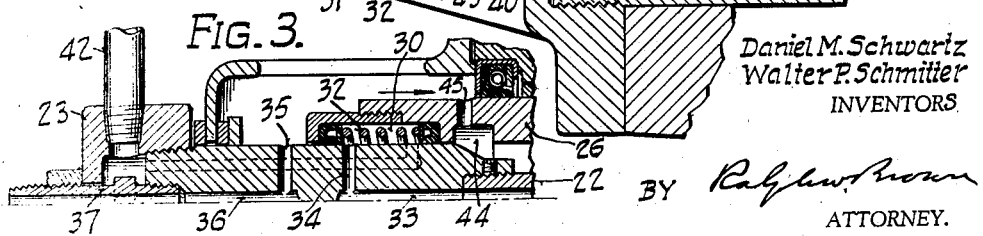
Fig. 3 is a fragmentary sectional view of the controller illustrating a second position of the valve.

It will thus be noted that, when the valve member 26 is in the advanced position of Fig. 2, the clutch gland 16 is expanded to close that clutch and to thereby effect rotation of the inner clutch member 14 and shaft 11 in one direction, the clutch gland 18 being deflated so that the other inner clutch member 17 is free to rotate in an opposite direction; and when the valve member 26 is in the retracted position of Fig. 3, the clutch gland 18 is expanded to close that clutch and thereby effect rotation of the shaft 11 in a reverse direction, the clutch gland 16 being deflated so that the inner member 14 of the other clutch is free to rotate reversely with the shaft 11. It will also be noted that by arranging the valve rather close to the clutches, the volumetric capacity of the connections between it and the clutch glands 16 and 18 may be reduced to a minimum, thereby reducing the time required to expand or deflate the clutch glands and consequently materially reducing the time required to reverse the direction of operation of the transmission. It will be further noted that the valve may be readily shifted into either extreme position by actuation of the tube 29 from the opposite end of the shaft 11.

Various changes may be made in the embodiment of the invention hereinabove specifically described without departing from or sacrificing the advantages of the invention as defined in the appended claims.

We claim:

1. The combination with a rotary fluid pressure clutching device, of a control valve rotatable therewith and comprising two members one movable axially relative to the other, one of said members having a port communicating with a source of fluid pressure and a separate port communicating with said device, the other of said members having means for connecting said ports when said members are in one position relative to each other and to uncover said last named port to exhaust when in another position.

2. A valve comprising a substantially cylindrical body member having a conduit extending longitudinally therein, and a port on the surface of said member communicating with said conduit, said member having a second port therein spaced lengthwise of said member from said first named port, said body member having a second conduit extending lengthwise thereof and connected to said second port, said member also having a third port disposed intermediate said first and second ports and having a third conduit extending lengthwise thereof and connected to said third port, and a sleeve member encircling said body member, one of said members being lengthwise movable relative to the other whereby said first named port is alternately covered and uncovered to expose said port to the open air, said sleeve member also having means for connecting said second port to the outer air when said first port is covered by said sleeve, said sleeve member also having means for connecting said third port with either of said first named ports alternately in response to said relative movement of said members.

3. In a device of the character described the combination of a torque transmitting shaft, a separately rotatable valve mounted adjacent one end of said shaft coaxially therewith, said valve including an axially fixed member having a fluid supply port and a plurality of outlet ports, a fluid supply conduit extending from said valve coaxially through said shaft to an external fluid supply source, a channelled member surrounding said axially fixed member and axially movable relative thereto to thereby connect said fluid supply port to said fluid outlet ports selectively, and a sleeve surrounding said fluid supply conduit and extending through said shaft for actuating said movable member.

4. The combination with a pair of rotary fluid pressure clutching devices, of a control valve disposed coaxially of said clutches, said valve comprising an inner member rotatable with said devices and having two ports respectively communicating therewith, said inner member also having a port communicating with a fluid pressure source, said valve also comprising an outer member, one of said members being axially movable relative to the other of said members, means in said outer member for connecting said last named port to one or the other of said first named ports in response to relative axial movement between said members, said first named ports being relatively disposed so that one is open to exhaust when the other is connected to said last named port.

WALTER P. SCHMITTER.
DANIEL M. SCHWARTZ.